(12) United States Patent
Tian et al.

(10) Patent No.: US 6,498,576 B1
(45) Date of Patent: Dec. 24, 2002

(54) SELECTIVE ANALOG-TO-DIGITAL CONVERSION FOR A DIGITAL PIXEL SENSOR

(75) Inventors: Hui Tian, Stanford; David Xiao Dong Yang, Mountain View, both of CA (US)

(73) Assignee: Pixim, Inc., Mountain View, CA (US)

( * ) Notice: Subject to any disclaimer, the term of this patent is extended or adjusted under 35 U.S.C. 154(b) by 0 days.

(21) Appl. No.: 09/823,344

(22) Filed: Mar. 30, 2001

Related U.S. Application Data

(63) Continuation-in-part of application No. 09/567,786, filed on May 9, 2000.

(51) Int. Cl.⁷ .................................................. H03M 1/12
(52) U.S. Cl. .................... 341/155; 341/156; 341/139; 341/122; 341/14; 341/160; 341/161; 348/294; 348/297
(58) Field of Search ........................ 341/155, 156, 341/160

(56) References Cited

U.S. PATENT DOCUMENTS

| | | | | |
|---|---|---|---|---|
| 3,750,146 A | * | 7/1973 | Lucas | 324/607 |
| 3,781,868 A | * | 12/1973 | Huber | 341/14 |
| 4,716,397 A | * | 12/1987 | Werba et al. | 341/156 |
| 5,302,952 A | * | 4/1994 | Campbell et al. | 341/122 |
| 5,461,425 A | * | 10/1995 | Fowler et al. | 250/208.1 |
| 5,801,657 A | * | 9/1998 | Fowler et al. | 341/155 |
| 6,124,819 A | * | 9/2000 | Zhou et al. | 341/155 |
| 6,268,820 B1 | * | 7/2001 | Sherry et al. | 341/139 |

\* cited by examiner

*Primary Examiner*—Patrick Wamsley
*Assistant Examiner*—Lam T. Mai
(74) *Attorney, Agent, or Firm*—Patent Law Group LLP; Carmen C. Cook

(57) ABSTRACT

A system and method for performing low-power analog-to-digital conversion in digital imaging system utilizing a time-indexed multiple sampling technique is presented. The analog-to-digital converter is switched off when the digital image signal resulting from an exposure time selected from a plurality of exposure times satisfies a threshold value.

17 Claims, 6 Drawing Sheets

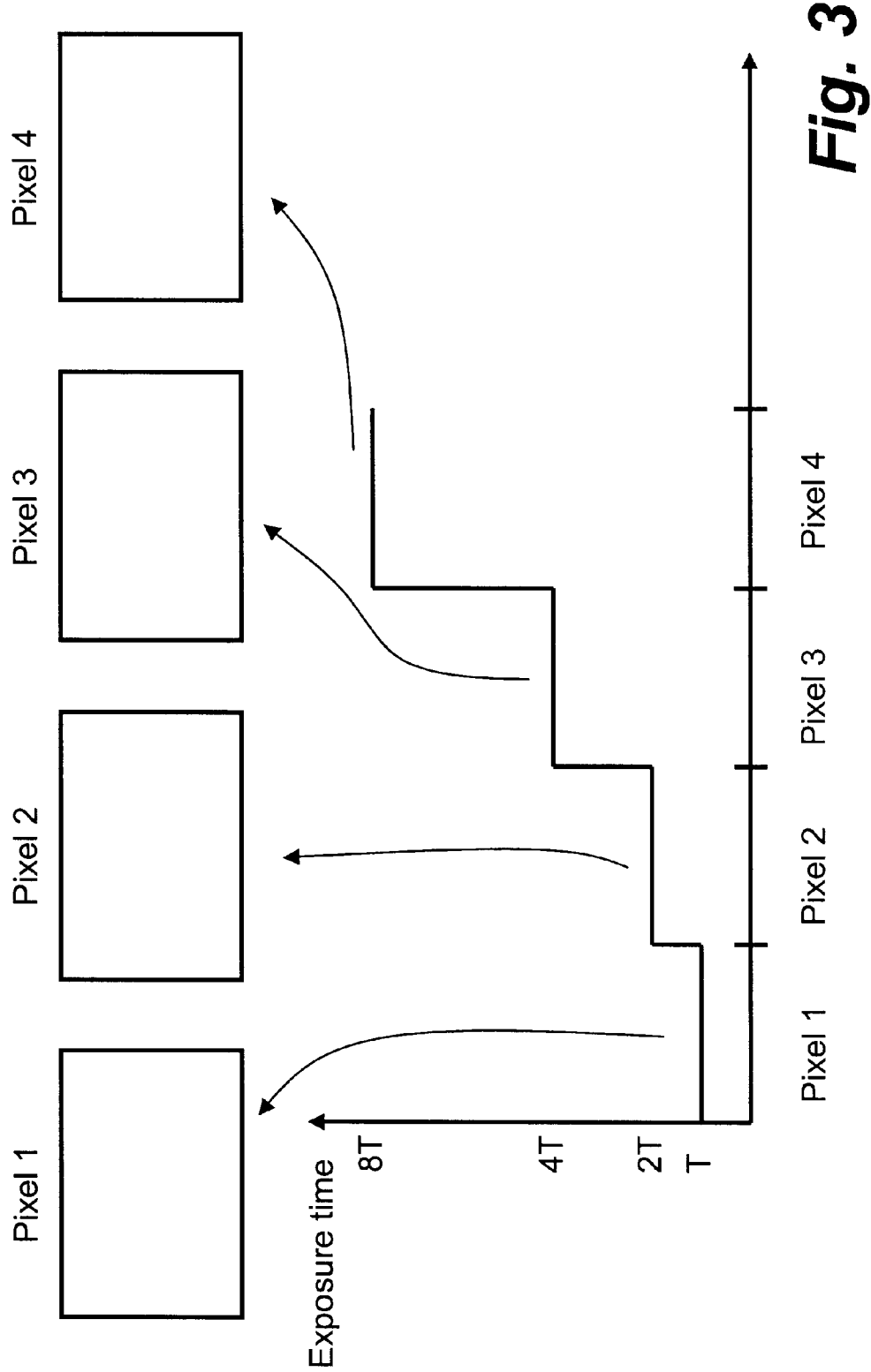

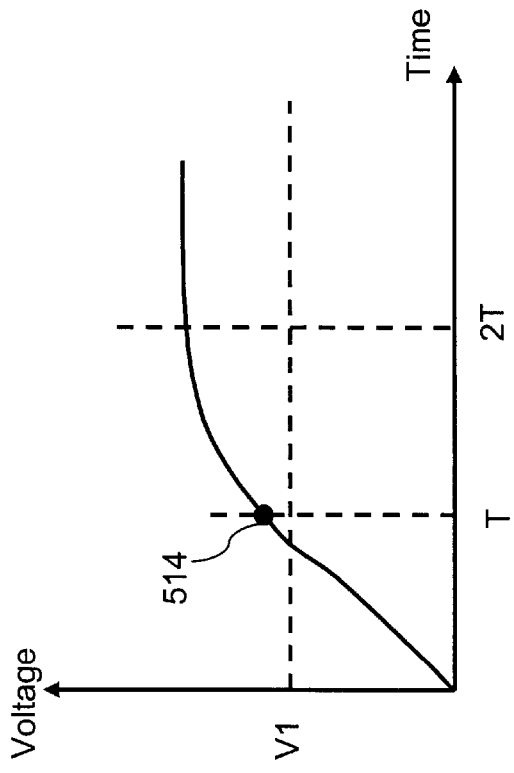
*Fig. 4B*
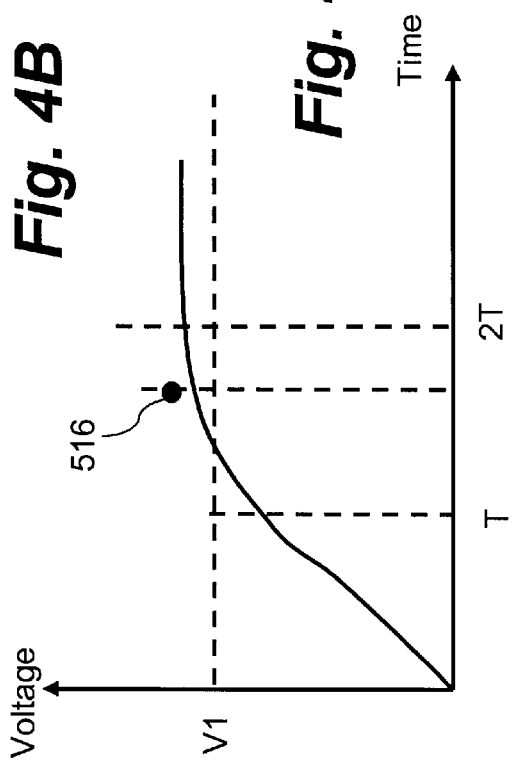
*Fig. 4C*
| 502 | 504 |
|---|---|
| 1 | 0 |
| 506 | 508 |
|---|---|
| T | 2T |
| 510 | 512 |
|---|---|
| 240 | 50 |
*Fig. 4A*

SELECTIVE ANALOG-TO-DIGITAL CONVERSION FOR A DIGITAL PIXEL SENSOR

RELATED APPLICATION

This application is a continuation-in-part of U.S. Ser. No. 09/567,786, filed May 9, 2000, which is incorporated by reference herein.

BACKGROUND

1. Field of the Invention

This invention relates to digital photography, and more particularly to a low power analog-to-digital converter for a multiple-sampling digital pixel sensor.

2. Description of Related Art

Digital photography is one of the most exciting technologies to have emerged during the twentieth century. With the appropriate hardware and software (and a little knowledge), anyone can put the principles of digital photography to work. Recent product introductions, technological advancements, and price cuts, along with the emergence of email and the World Wide Web, have helped make the digital cameras one of the hottest new category of consumer electronics products.

Digital cameras, however, do not work in the same way as traditional film cameras do. In fact, they are more closely related to computer scanners, copiers, or fax machines. Most digital cameras use an array of pixel sensors or photosensitive devices, such as a charged-coupled devices (CCD) or complementary metal-oxide semiconductor (CMOS) sensors to sense an image. The array of these pixel sensors are arranged in the focal plane of the camera such that each sensor produces an electrical signal proportional to the light intensity received at its location.

The image thus produced has a resolution determined by the number of sensors in the array. A modern digital camera may have a million or more of these sensors. The resulting digital image has discrete picture elements (pixels) corresponding to the number of sensors in the array. Because of the correlation, the sensor elements themselves are often referred to as pixel sensors as well. The light intensity received by each pixel sensor is expressed as a discrete value.

It is known to organize the pixel sensor array in two dimensions, addressable by row and column. Once a row of elements has been addressed, the analog signals from each of the pixel sensors in the row are coupled to the respective columns in the array. An analog-to-digital converter (ADC) may then be used to convert the analog signals on the columns to digital signals so as to provide only digital signals at the output of the array, which is typically formed on an integrated circuit.

Because of a number of problems such as degradation of signal and slow read out times in prior art pixel sensor arrays, a "digital sensor pixel" has been developed as described in, e.g., U.S. Pat. No. 5,461,425, which is hereby incorporated by reference. FIG. 1 illustrates an array 12 of digital sensor pixels 14 on an integrated circuit 10. Each digital sensor pixel 14 in the array 12 includes a photodetector and a dedicated ADC such that the pixel 14 outputs a digital rather than an analog signal as in prior art pixel sensor arrays. In contrast, prior art pixel sensor arrays did not have a dedicated ADC for each individual sensor in the array. Digital filters 16 on integrated circuit 10 are connected to receive the digital output streams from each digital pixel sensor 14 and convert each stream to, e.g., an eight-bit number representative of one of 256 levels of light intensity detected by the respective digital pixel sensor 14. Within the digital pixel sensor 14, the analog signal from the phototransistor is converted into a serial bit stream from its dedicated ADC clocked using a common clock driver 18. The digital filters 16 process the bit stream from each digital pixel sensor 14 to generate an eight-bit value per pixel element 14. These eight-bit values may then be output from the chip 10, using a suitable multiplexer or shift register, and temporarily stored in a bit-mapped memory 24.

Because a digital signal is produced directly by the pixel 14, several advantages over the prior art become apparent. For example, dynamic range is a critical figure of merit for pixel sensors used in digital cameras. The dynamic range of an pixel sensor is often not wide enough to capture scenes with both highlights and dark shadows. This is especially the case for CMOS sensors that, in general, have lower dynamic range than CCDs.

To address the need for increased dynamic range, U.S. Ser. Nos. 09/567,786 and 09/567,638, both filed May 9, 2000 and incorporated by reference herein, disclose an architecture for the digital pixel sensor in which the dynamic range of the sensor is increased by taking multiple samples of a subject during a single imaging frame, where each sample is taken over an interval of a predetermined duration. As used herein, a "frame" shall denote the period of time during which the multiple exposures for a single image occur as formed by an array of digital pixel sensors.

Although this multiple sampling method provides an increased dynamic range, it may suffer from excessive power consumption by its analog-to-digital converters. For example, if a pixel's image sample within a given frame approaches or reaches saturation, subsequent image samples from this same pixel within this frame provide no further information because they too will be saturated. Despite their saturation, however, the analog-to-digital converters will continue to process these signals, needlessly wasting power.

Accordingly, there is a need in the art for a digital imaging system whose analog-to-digital converters do not process signals from pixels that are saturated.

SUMMARY

In accordance with one aspect of the invention, a system for performing low-power analog-to-digital conversion in a time-indexed multiple sampling digital imaging system is presented using an array of pixel sensors. Multiple exposure times are used for each pixel sensor to form an image during a single frame. An analog image signal is produced by each pixel sensor for each exposure time wherein, prior to satisfaction of a threshold value, an analog-to-digital converter converts each analog image signal into a corresponding digital image signal. The analog image signals are tested against a threshold value. If the threshold value is exceeded for a given pixel sensor, its analog-to-digital converter is prevented from converting the pixel sensor's analog image signals from subsequent exposure times in the frame. However, those pixel sensors whose analog image signals have not exceeded the threshold value will continue to be converted by their analog-to-digital converters for this frame.

In accordance with another aspect of the invention a method of low power analog-to-digital conversion using a time-indexed multiple sampling technique is presented. The method uses a time-indexed multiple-sampling digital imaging system having an array of pixel sensors. Each pixel sensor in the array produces a plurality of analog image signals corresponding to a plurality of exposure times used for each frame. In addition, an analog-to-digital converter is configured to convert the analog image signals into corresponding digital image signals. The method includes a step of testing, after each exposure time, whether the corresponding analog image signal from each pixel sensor satisfies a threshold value. If the threshold is satisfied for a given exposure time in a given pixel sensor within the array, the method includes a further step of preventing the analog-to-digital converter from converting analog image signals from this pixel sensor resulting from exposure times subsequent to the given exposure time in the frame.

The invention will be more fully understood upon consideration of the detailed description below, taken together with the accompanying drawings.

BRIEF DESCRIPTION OF THE DRAWINGS

FIG. 3 is a graph that shows an example of multiple exposures.

FIG. 4a is a block diagram that shows a pair of exemplary threshold memory cells, time index memory cells, and corresponding data memory cells for a time-indexed multiple sampling method.

FIGS. 4b and 4c are graphs that show, respectively, two corresponding time integration processes as occurring in a time-indexed multiple sampling method.

Use of the same reference symbols in different figures indicates similar or identical items.

DETAILED DESCRIPTION OF THE PREFERRED EMBODIMENTS

Figure 2:
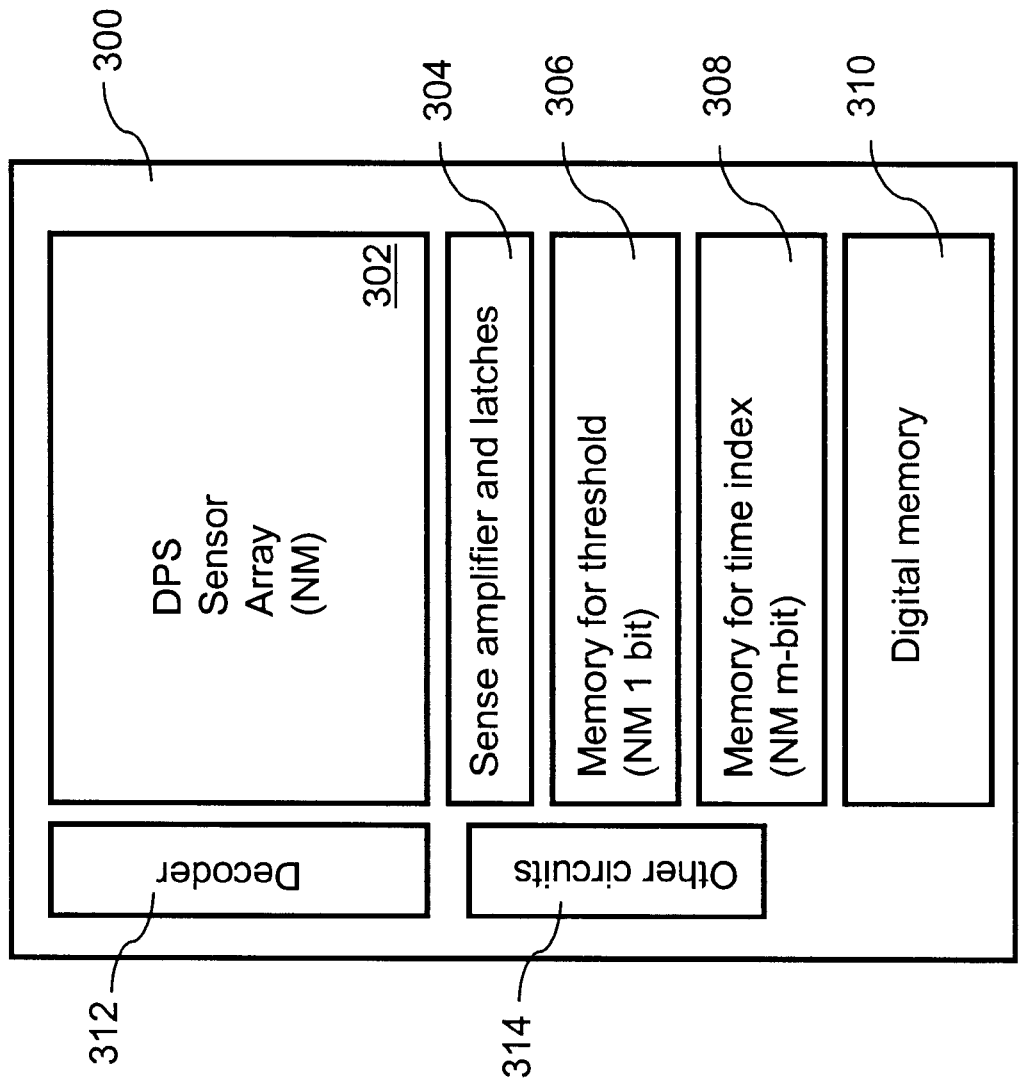
FIG. 2 is a block diagram which shows an pixel sensor including a threshold memory, a time index memory, and a separate data memory for implementing a time-indexed multiple sampling method to achieve wide dynamic range.

Referring to FIG. 2, there is shown an image sensor 300 for performing a time-indexed multiple sampling method according to the methods disclosed in copending U.S patent application Ser. No. 09/567,786. The image sensor includes an array 302 of digital pixel sensors as discussed with respect to U.S. Pat. No. 5,461,425. Sense amplifiers and latches 304 are coupled to the digital pixel sensor array 302 to facilitate read out of the digital signals from the digital pixel sensor array 302. The pixel sensor 300 also includes a memory 306 (referred to herein as a threshold memory) for storing threshold values, a memory 308 (referred to herein as a time index memory) for storing time index values, and a digital or data memory 310 that is large enough to accommodate a frame of image data from array 302.

To illustrate the time-indexed multiple sampling method, it may be assumed that the array 302 is of N by M pixels, wherein each pixel produces an image signal of k-bits. In this frame, however, a given pixel may select between a plurality of exposure times. For example, the pixel may select from four different exposure times: T, 2T, 4T, and 8T, where T is a suitable value, e.g., 2 milliseconds. Such an array 302 thus produces, for each pixel sensor, four image samples per frame at four different exposure times (thereby performing a multiple sampling method). During each exposure time, the analog signal produced by each pixel sensor within the array 302 is tested against a threshold. If the signal exceeds the threshold, a binary flag in threshold memory 306 is set. For an N by M array 302, the size of the threshold memory 306 is of N by M bits. Within each frame, the different time exposures are assigned an integer time index value as determined by the time resolution of the frame division. For example, if the frame is divided into exposure times of T, 2T, 4T, and 8T, the binary time index would be 00, 01, 10, and 11, respectively (two-bit resolution). An example pixel resolution of array 302 is 1000 by 1000 in 10 bits. Thus, the threshold memory 306 is a one-megabit memory, the time index memory 308 is a two-megabit memory, and the digital memory 310 preferably has a size of at least 1.2 megabytes.

FIG. 3 illustrates four digital pixel sensors using a time-indexed multiple sampling method wherein each image frame is divided into exposure times of T, 2T, 4T, and 8T, where T is a suitable unit of time, for example, a few milliseconds. The light intensity at pixel 1 is relatively intense and decreases for pixel 2. It continues to decrease at pixel 3 and again at pixel 4. Because the light intensity is relatively intense at pixel 1, the threshold used for the multiple sampling method is exceeded in the first exposure time of duration T. Thus, pixel 1 uses the exposure time T for this image frame. Similarly, because the light intensity is lower at the location of pixel 2, the threshold is not exceeded at this pixel until the exposure time of 2T. Thus, pixel 2 uses the exposure time 2T for this image frame. Because the light intensity is even lower for pixel 3 and more so at pixel 4, the exposure times are 4T and 8T, respectively, for these pixels. One of the advantages of having multiple images of the same target is the ability to expand the dynamic range of the image thus captured. Because of the relative short exposure time, the use of a 1T exposure time in pixel 1 typically captures information that is related to high illumination areas in the target. Likewise, because of the relatively long exposure time, the use of an 8T exposure time in pixel 4 typically captures information that is related to low illumination areas in the target. Pixel 2 and pixel 3 thus capture information that is related to gradually decreased illumination areas in the target. As a result, after the images are properly weighted as determined by their exposure times as given by the corresponding index, the combination of the multiple exposure times in a single image frame provides a very wide dynamic range.

After the first set of data for the first exposure time T is read out into the memory 310, the second set of data corresponding to the second exposure time 2T is selectively read out into the memory 310 to improve, update, or enhance the pixel values contained therein. As will be discussed in further detail with respect to FIG. 4A, this updating or enhancement of the data from the first set is only performed if the threshold bit is not set. FIG. 4A shows a pair of exemplary threshold memory cells 502 and 504, exemplary time index memory cells 506 and 508, and exemplary corresponding data memory cells 510 and 512. After a first exposure time T, as shown in FIG. 4B, it is shown that the resultant signal 514 exceeds a predefined threshold V1. Thus, a flag, such as a binary value "1" which represents that the threshold value V1 has been exceeded, is stored in the cell 502, the exposure time T is stored in the cell 506, and the resultant signal or a representation thereof (e.g. the value 240 in eight-bit precision) is stored in the cell 510. The value of threshold V1 is usually determined such that further exposure to the pixel sensor that produces resultant signal 514 can cause the pixel sensor to become saturated. Therefore, in view of the flag in the cell 502, there is no need to enhance the value stored in the cell 510 after the first exposure time T. In reality, further update of the cell 510 could cause the loss of the data therein as it is now clear that the next value would be a saturated value.

It is now assumed that at time T, a resultant signal 516 produced by an adjacent photodetector is below the threshold V1, as shown in FIG. 4C. Therefore, the cell 504 does not store the flag "1", assuming that the cell 504 was initialized to "0". This permits the corresponding data cell 512 to be updated or enhanced with a new value from the next exposure time, 2T. It should be noted that the exact contents to be stored in the cells 502, 504, 506, or 508 depend largely on an implementation preference.

A feature of the time-indexed multiple sampling method is to provide a flag on each of the photodetectors in the array 302 or each of the data cells in the memory 310 to prevent any saturated values from overwriting an existing value in the memory 310. The contents in the time index memory are used individually so that the final image can be regenerated correctly. For example, if a first pixel had a low light illumination such that the exposure time was 8T whereas a second pixel had a high level of illumination such that its exposure time was T, the final image containing this first and second pixel would have to reduce the signal level in the second pixel relative to the first pixel as determined by the relative difference in exposure time (a factor of eight in this example). This allows the contents in the memory 310 to be updated properly after additional exposure times, or allows the sets of data from the various exposure times to be combined properly (combined in the sense of forming an image using pixels corresponding to different exposure times).

Note the advantages provided by this time-indexed multiple-sampling method. A first pixel in an image may have a relatively long exposure time as appropriate for a pixel with a low level of light intensity. Such an exposure time would saturate, however, a second pixel sensing a higher level of light intensity, thus requiring a shorter exposure time. In a prior art array in which each pixel is given the same exposure time, the user would be faced with the following dilemma: If the user integrates for a long period to enhance the signal for the first pixel, the second pixel is saturated. Alternatively, if the user integrates for a relatively short period to avoid saturation in the second pixel, the signal level for the first pixel suffers. Thus, a time-indexed multiple sampling method provides a significant advantage in dynamic range over fixed integration time prior art pixel arrays.

Figure 1:
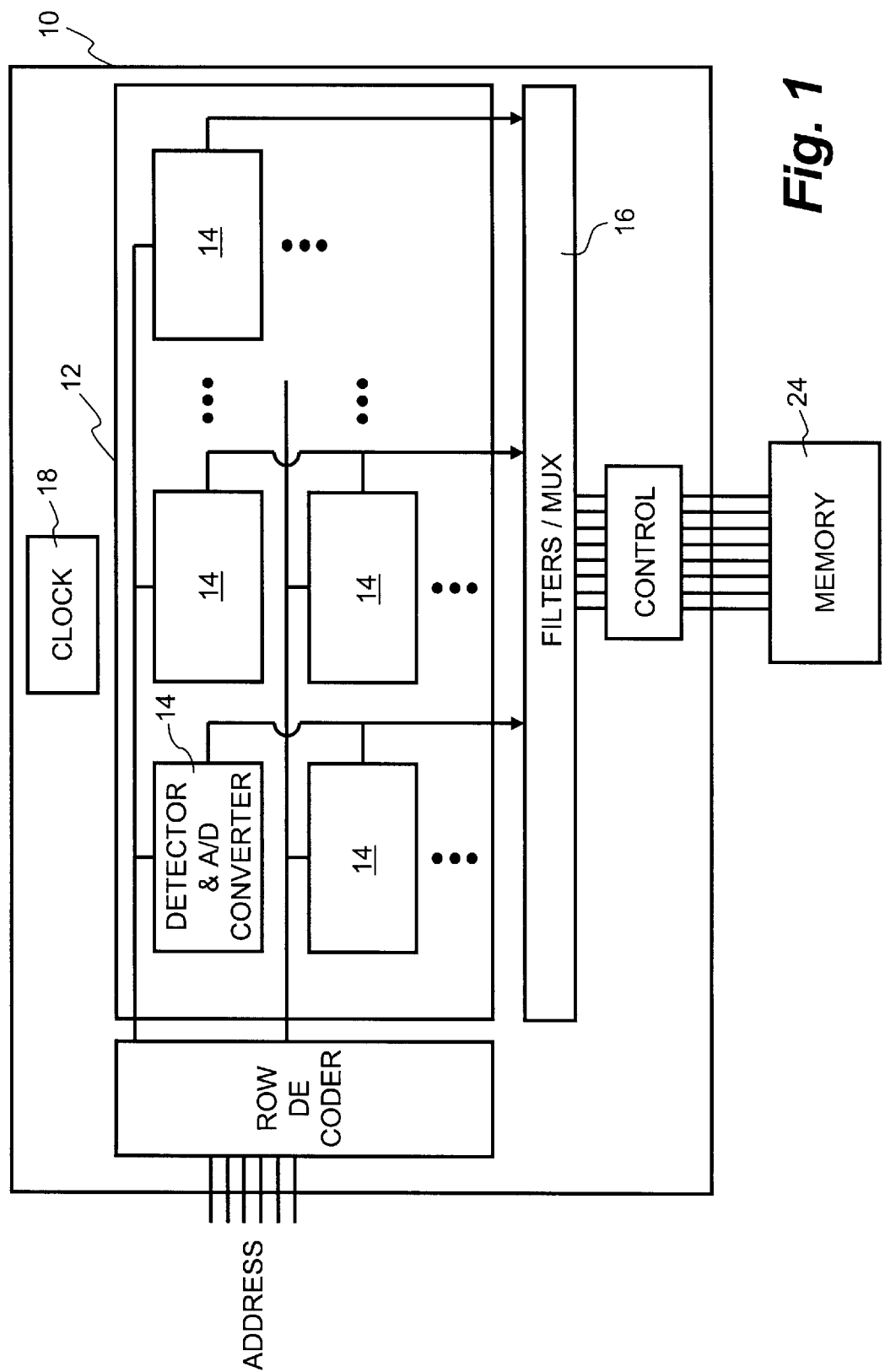
FIG. 1 is a block diagram of an integrated circuit containing digital pixel sensors wherein each sensor has a dedicated A/D converter.

Despite the advantages of current time-indexed multiple-sampling techniques, certain disadvantages remain. For example, consider the power demands of a digital sensor pixel 14 in FIG. 1 implementing an time-indexed multiple-sampling technique selecting among four exposure time per frame: T, 2T, 4T, and 8T. If the light intensity is relatively high for exposure time T such that the digital pixel sensor 14 sets its binary flag indicating that the threshold V1 has been exceeded, the data memory 310 of FIG. 2 will not be updated with any values produced by the digital pixel sensor 14 for the remaining exposure times 2T, 4T, and 8T. Although the data memory 310 will not store, for this pixel, any of the resulting digital image signal values corresponding to these additional exposure times, the A/D converter within the digital pixel sensor will continue to operate to produce these digital image signal values. Such unnecessary operation of the A/D converter wastes energy, a waste that is particularly unwelcome for digital cameras since they typically depend on a battery as a power source. The limited charge time of these batteries is shortened by this unnecessary use of the A/D converters, resulting in inconvenience to the user.

The present invention discloses a low-power A/D converter that does not convert signals from pixels whose threshold has been exceeded in previous exposure times, thereby preventing unnecessary power waste. The invention is applicable to any A/D converter suitable for use in a time-indexed multiple-sampling digital pixel sensor array. For example, suitable A/D converters are disclosed in U.S. Pat. No. 5,801,657, the contents of which is hereby incorporated by reference.

Figure 5:
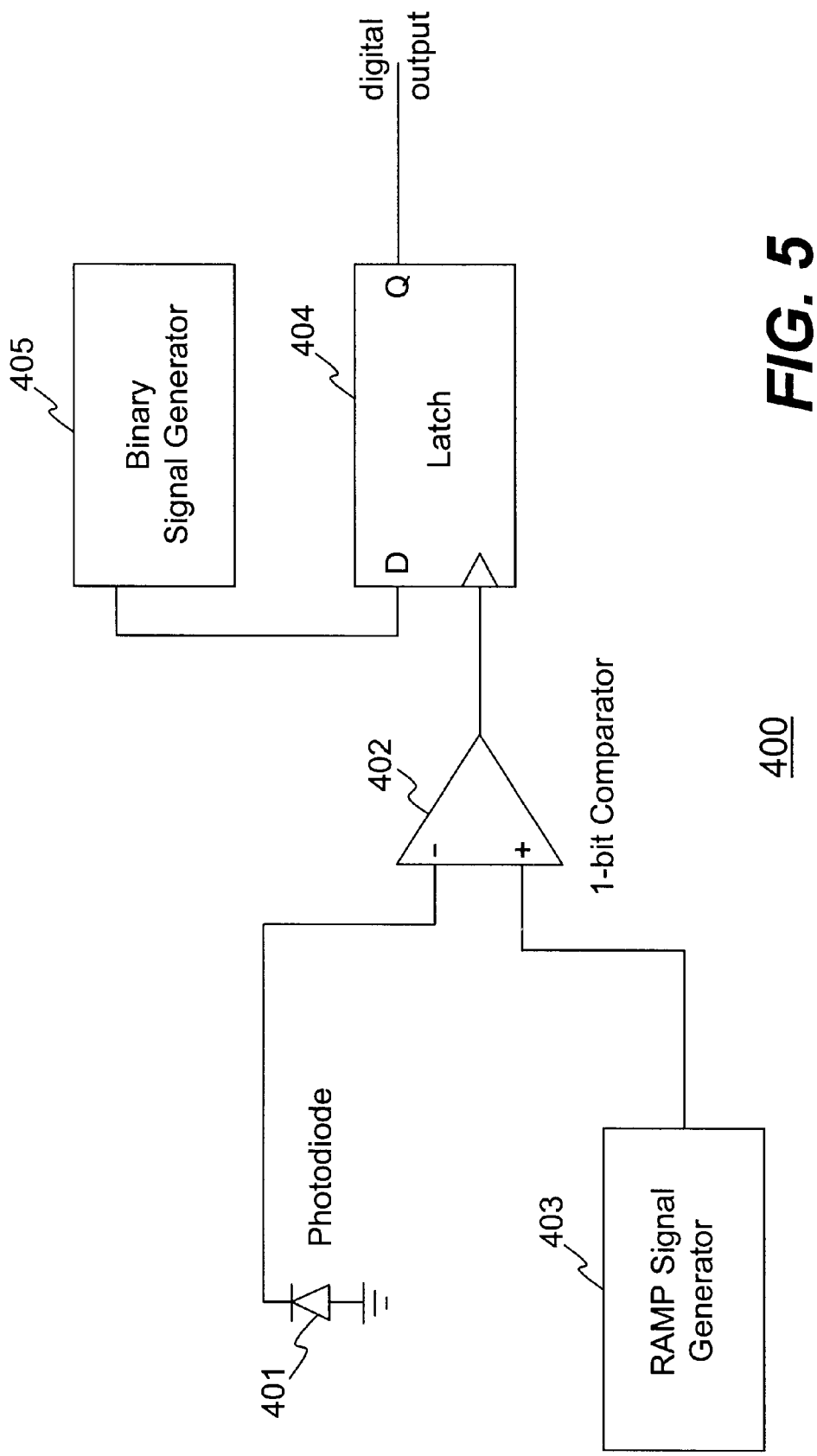
FIG. 5 is a schematic illustration of a serial analog-to-digital converter.

Turning now to FIG. 5, a block diagram for an A/D converter 400 that may be converted according to the invention is shown. A photodiode sensor 401 generates an analog voltage representative of the light intensity at a pixel location. This voltage couples to a 1-bit comparator 402. To allow A/D conversion for multiple photodiodes, a sampling transistor (not shown) may be inserted between the comparator 402 and the photodiode 401. In this fashion, the comparator 402 would be shared amongst several photodiodes, whereby a selected photodiode couples to the comparator 401 by having its sampling transistor switched on. The comparator 402 compares the signal from the photodiode to a signal from the ramp signal generator 403. If the signal from the photodiode 401 is greater than the signal from the ramp signal generator 403, the comparator 402 outputs a 1, otherwise it outputs a 0.

The number of bits of precision desired for the A/D converter 401 determines the number of comparisons required at the comparator 402. For example, 3 bits code for 8 binnary levels, requiring 8 binnary comparisons at the comparator 402. The ramp signal generator 403 may generate either an analog or a digital signal for the required binary levels. If the ramp signal generator 403 produces an analog ramp signal, the signal may simply increase linearly from zero to the maximum anticipated analog input from the photodiode 401.

A latch 404 has its G input (clock input) coupled to the output terminal of the comparator 402. When this G input is high, the latch output follows the value of a binary signal from a binary signal generator 405. If the G input is low, indicating that the ramp signal is greater than the photodiode output, the latch output remains in its previous state.

The value of the binary signal from the binary signal generator 405 depends upon whether the ramp signal generator 403 outputs an analog or digital signal and upon the type of N-bit code produced by the A/D converter 400. For example, a typical code is a Gray code wherein successive binary levels (for the photodiode signal) are mapped into codewords that differ by one bit. If a Gray code is desired and the ramp signal is linear ramp signal as described previously, the binary signal generator 405 outputs the bit sequence of all the Gray codewords at a particular bit position.

The comparator 402 is an abstract circuit concept—in reality, it requires a number of transistors to construct, e.g., a transconductance stage and a cascode amplifier stage (not illustrated). This plurality of transistors (typically in excess of 7 transistors) consumes power unnecessarily when the output of the comparator is not required, such as if the threshold bit has been set in a time-indexed multiple-sampling system.

Figure 6:
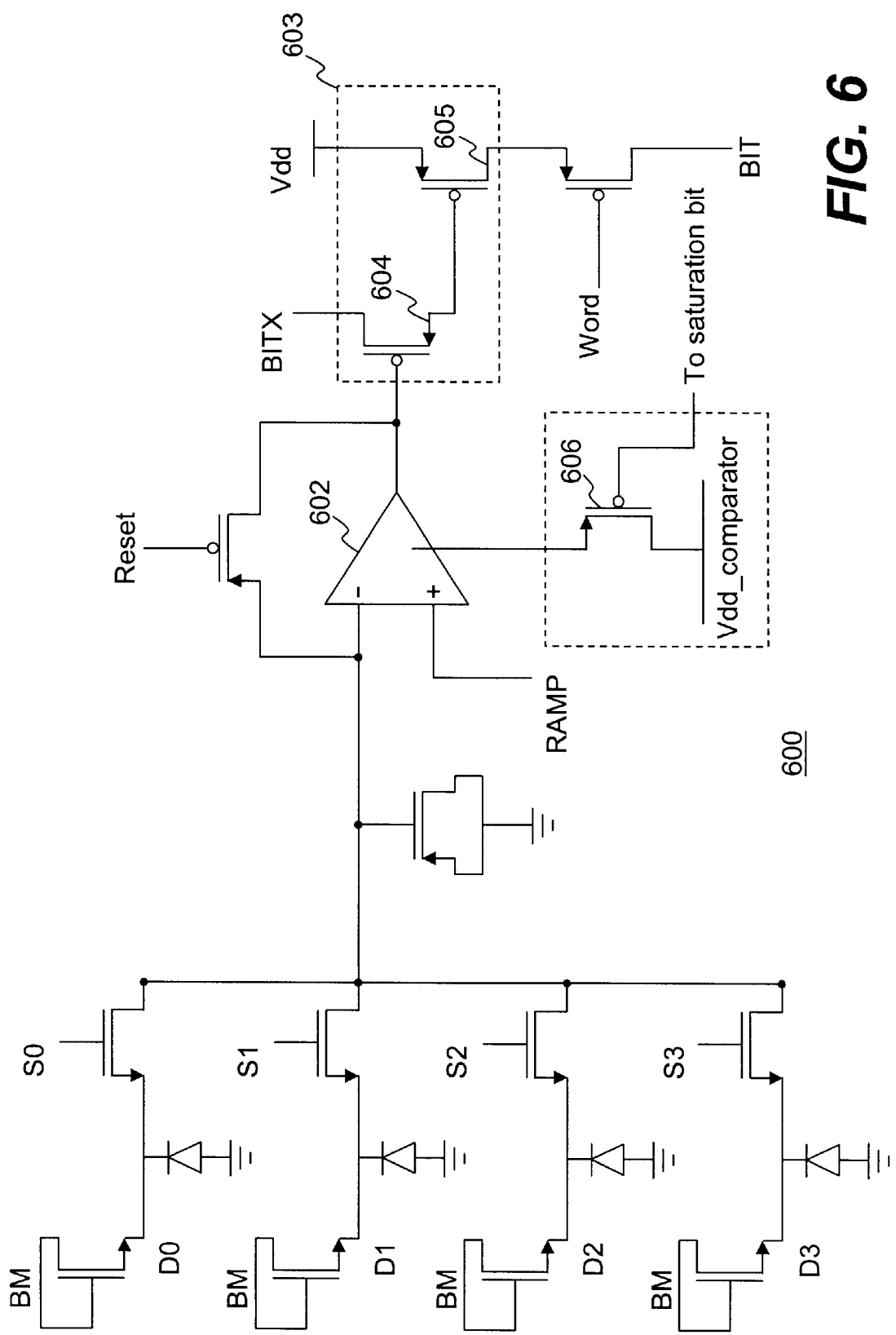
FIG. 6 is a circuit diagram for a low-power analog-to-digital converter according to one embodiment of the invention.

Turning now to FIG. 6, an A/D converter 600 according to one embodiment of the invention is illustrated. A one-bit comparator 602 receives a ramp signal as described with respect to FIG. 5. However, in this case, four photodiodes D0 though D3 share the 1-bit comparator 602. Each photodiode is coupled to the one-bit comparator 602 only when its respective sampling transistor (S0 through S3) is switched on. For example, photodiode D0 couples to the comparator when sampling transistor S0 is switched on. A latch 603 is constructed as a two transistor DRAM cell where transistor 604 is the pass transistor (write port) and transistor 605 is the output buffer (read port). Latch 603 operates as described for latch 404 of FIG. 5, where BITX signal is the output of a binary signal generator (not shown but similar to binary signal generator 405) that is latched into the output buffer when the one-bit comparator 602 output signal is high (i.e., when a photodiode output is greater than the ramp signal). However, unlike the A/D converter of FIG. 5, the one-bit comparator will only be operative if the saturation bit from the threshold memory 306 (discussed with respect to FIG. 2) is not set high (or true). If the saturation bit is set, that indicates that further samples in a multiple-sampling system may be saturated and will be ignored. Thus, it would be wasteful for the one-bit comparator 602 to process these values. The saturation bit signal couples to a PMOS transistor 606. PMOS transistor 606 is switched off if the saturation bit signal is high, preventing a path to voltage Vdd for the one-bit comparator and preventing any waste of power with respect to processing saturated signals from the photodiodes D0–D3. As discussed previously, the one-bit comparator 602 comprises a plurality of transistors and is a logical choice for a circuit element to be switched off if the saturation bit is high. As yet another embodiment, an NMOS transistor (not illustrated) could be placed within the comparator's path to ground, requiring an inverter for the saturation bit input signal. Furthermore, other types of transistors capable of switching the comparator on or off could be used such as a JFET transistor. The losses in the one-bit comparator 602 represent the most significant source of losses in the A/D converter 600. Nevertheless, other components in the A/D converter 600 could also be operatively switched on or off according to the state of the saturation bit to save power as well.

Although the invention has been described with reference to a time-indexed multiple sampling system, the description is only illustrative of the invention and should not be taken as limiting. For example, the invention is widely applicable to any imaging system implementing multiple exposure times wherein a given exposure time may produce a saturated image. Consequently, various adaptations and combinations of features of the embodiments disclosed are within the scope of the invention as defined by the following claims.

We claim:

1. A method of analog-to-digital conversion for a pixel sensor configured to produce an analog signal for each of a plurality of exposure times within a frame, the pixel sensor being coupled to an analog-to-digital converter for converting the analog signals into digital signals, the method comprising:
   determining whether the analog signals resulting from exposure times subsequent to a given exposure time should be converted; and
   if the determining step indicates the analog signals resulting from exposure times subsequent to the given exposure time should not be converted, disabling the analog-to-digital converter from converting these analog signals.

2. The method of claim 1, wherein the determining step tests whether the analog signal resulting from the given exposure time exceeds a threshold.

3. The method of claim 2, further comprising:
   setting a binary flag if the testing indicates the analog image signal resulting from the given exposure time exceeds the threshold value.

4. The method of claim 3, wherein the analog-to-digital converter comprises a one-bit comparator, and wherein the disabling step comprises switching off the one-bit comparator in response to the state of the binary flag.

5. The method of claim 4, wherein the one-bit comparator has a DC path to ground including a switch and the one-bit comparator is switched off by turning off the switch.

6. The method of claim 4, wherein the one-bit comparator has a DC path to a power supply including a switch and the one-bit comparator is switched off by turning off the switch.

7. The method of claim 6, wherein the switch is a PMOS transistor having a gate coupled to receive the binary flag, the binary flag being in a high voltage state when the threshold value is exceeded.

8. A pixel sensor system, comprising:
   a pixel sensor configured to producing an analog image signal for each of a plurality of exposure times during a frame, and
   an analog-to-digital converter for converting the analog signals into corresponding digital signals, the analog-to-digital converter having a switch for switching the analog-to-digital converter on and off,
   wherein the pixel sensor system is configured to test, after each exposure time, the resulting analog signal against a threshold value, the pixel sensor system switching off the analog-to-digital converter's switch if the threshold value is exceeded.

9. The pixel sensor system of claim 8, wherein the pixel sensor system is further configured to set a binary flag if the threshold value is exceeded during a frame, the analog-to-digital converter's switch being responsive to the binary flag.

10. The pixel sensor system of claim 9, wherein the analog-to-digital converter includes a one-bit comparator having a DC path to ground, the DC path including the switch.

11. The pixel sensor system of claim 10, wherein the switch is a NMOS transistor, the binary flag being set to a low voltage state when the threshold value is satisfied.

12. The pixel sensor system of claim 9, wherein the analog-to-digital converter includes a one-bit comparator having a DC path to a power supply, the DC path including the switch.

13. The pixel sensor system of claim 12, wherein the witch is a PMOS transistor, the binary flag being set to a high voltage state when the threshold value is satisfied.

14. The pixel sensor system of claim 8, wherein the plurality of exposure times comprises integer multiples of a period T.

15. The pixel sensor system of claim 14, wherein the plurality of exposure times comprises T, 2T, 4T, and 8T.

16. The pixel sensor system of claim 8, wherein the threshold value is chosen such that the corresponding digital image signal exceeding the threshold is substantially saturated.

17. A method of analog-to-digital conversion for an array of pixel sensors, each pixel sensor being configured to produce an analog signal for each of a plurality of exposure times within a frame, each pixel sensor being coupled to its own analog-to-digital converter for converting the analog signals into digital signals; the method comprising:

after each exposure time:

determining which pixel sensors whose analog signal will be converted and which pixel sensors whose analog signal will not converted;

converting the analog signals from those pixel sensors as determined in the determining step, and for those pixel sensors whose analog signals will not be converted, disabling the analog-to-digital converters for these pixel sensors from converting their analog signals.

* * * * *